(12) United States Patent
Lin et al.

(10) Patent No.: US 8,144,409 B2
(45) Date of Patent: Mar. 27, 2012

(54) PRISM SYSTEM AND METHOD FOR PRODUCING THE SAME

(75) Inventors: Hsin-Li Lin, Taipei Hsien (TW); I-Pen Chien, Taipei Hsien (TW); Kuang-Wei Lin, Taipei Hsien (TW); Po-Yuan Lai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 951 days.

(21) Appl. No.: 12/122,530

(22) Filed: May 16, 2008

(65) Prior Publication Data

US 2009/0067071 A1   Mar. 12, 2009

(30) Foreign Application Priority Data

Sep. 7, 2007   (CN) .......................... 2007 1 0201618

(51) Int. Cl.
  *G02B 1/11*    (2006.01)
  *G02B 5/04*    (2006.01)
  *G02B 27/00*   (2006.01)

(52) U.S. Cl. ........ 359/831; 359/833; 359/837; 359/601; 359/583

(58) Field of Classification Search .................. 359/601, 359/831
  See application file for complete search history.

(56) References Cited

U.S. PATENT DOCUMENTS

| 1,959,538 | A | * | 5/1934 | Langenhagen et al. | ........ 359/835 |
| 3,514,182 | A | * | 5/1970 | Banks | ......... 359/222.1 |
| 4,628,175 | A | * | 12/1986 | Nissl | ............... 219/110 |
| 4,701,772 | A | * | 10/1987 | Anderson et al. | ............. 347/136 |
| 4,733,926 | A | * | 3/1988 | Title | ................ 359/352 |
| 4,913,528 | A | * | 4/1990 | Hasegawa | ..................... 359/638 |
| 5,187,543 | A | * | 2/1993 | Ebert | ............... 356/487 |
| 5,237,446 | A | * | 8/1993 | Takahashi | ..................... 359/359 |
| 5,568,315 | A | * | 10/1996 | Shuman | .................. 359/485.03 |
| 5,737,124 | A | * | 4/1998 | Sarayeddine | ............ 359/485.07 |
| 6,171,421 | B1 | * | 1/2001 | Murata et al. | ................... 156/99 |
| 2003/0053181 | A1 | * | 3/2003 | Nizani | ........................ 359/189 |
| 2007/0086094 | A1 | | 4/2007 | Tang et al. | |
| 2007/0211339 | A1 | * | 9/2007 | Furusato | ....................... 359/495 |

FOREIGN PATENT DOCUMENTS

| JP | 62-287205 | A | | 12/1987 |
| JP | 5-173020 | | * | 7/1993 |
| JP | 8-220312 | A | | 8/1996 |
| JP | 8-297203 | A | | 11/1996 |
| JP | 11-287903 | | * | 10/1999 |
| TW | I287118 | | | 1/1988 |

* cited by examiner

*Primary Examiner* — Ricky Shafer
(74) *Attorney, Agent, or Firm* — Altis Law Group, Inc.

(57) ABSTRACT

A prism monomer for use in a digital light processing projection device includes a plastic triangular prism having a hypotenuse surface and a glass sheet. The glass sheet has two opposite surfaces. One surface of the glass sheet is attached to the hypotenuse surface of the plastic triangular prism and the other surface of the glass sheet is formed with an anti-reflective coating.

6 Claims, 3 Drawing Sheets

PRISM SYSTEM AND METHOD FOR PRODUCING THE SAME

FIELD OF THE INVENTION

The present invention relates to a prism system and, particularly, to a prism system for use in digital light processing (DLP) projection devices.

BACKGROUND

In tri-panel DLP applications, total internal reflection (TIR) prisms are used to change the light path of DLP devices, thereby reducing the size of the DLP devices. Such TIR prisms typically include two triangular prisms arranged such that the hypotenuse surfaces thereof are glued to each other, but a space is left in between. The triangular prism is typically made of glass, which is suitable for coating. However, it is difficult to shape these glass prisms accurately (requiring accuracy in the cutting, grinding, and polishing processes), and therefore production yield is extremely low.

Therefore, it is desirable to provide a prism system, which can overcome the above mentioned problem.

SUMMARY

A prism monomer for use in a digital light processing projection device includes a plastic triangular prism having a hypotenuse surface and a glass sheet. The glass sheet has two opposite surfaces. One surface of the glass sheet is attached to the hypotenuse surface of the plastic triangular prism and the other surface of the glass sheet is formed with an anti-reflective coating.

DETAILED DESCRIPTION OF THE EMBODIMENTS

Embodiments of the present TIR prism will be described in detail below with reference to the drawings.

Figure 1:
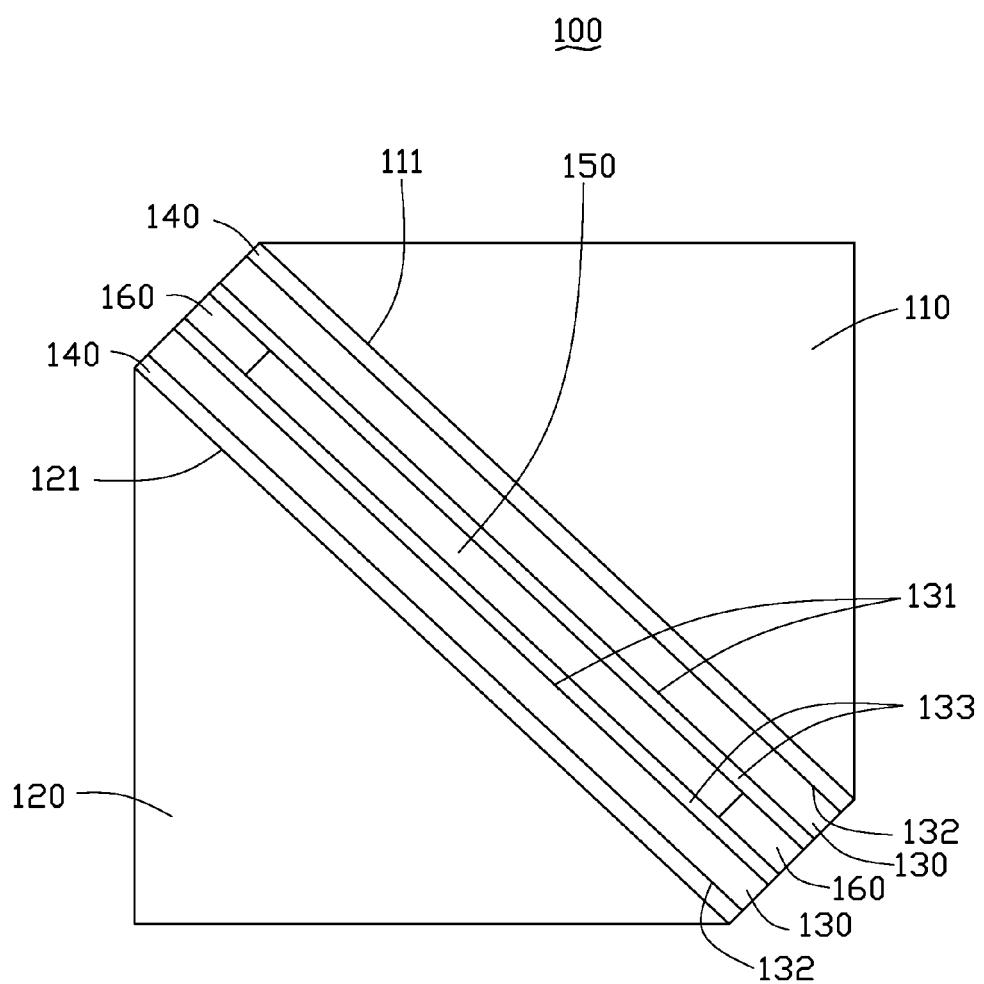
FIG. 1 is a schematic view of a TIR prism according to a first exemplary embodiment.

Referring to FIG. 1, a TIR prism 100 includes two symmetrical triangular prisms 110, 120, and two sheets 130. The sheets 130 are interposed between the two symmetrical triangular prisms 110, 120.

The two triangular prisms 110, 120 are made from plastic material and are manufactured by injection molding. The two triangular prisms 110, 120 respectively have two hypotenuse surfaces 111, 121 facing each other. The two sheets 130 are made from glass. Each of the two sheets 130 has two opposite surfaces 131, 132. The surfaces 132 of the two sheets 130 are respectively attached to the hypotenuse surfaces 111, 121 of the two triangular prisms 110, 120 by a first adhesive 140. The first adhesive 140 is made of a UV-curable resin. The two triangular prisms 110, 120 have the same refractive index as that of the first adhesive 140.

The other surfaces 131 of the sheets 130 respectively have anti-reflective coatings 133 formed thereon that face each other and are fixed to each other with a space 150 left therebetween due to a second adhesive 160. The second adhesive 160 is made from a thermoset resin and is configured for attaching the edge of the two surfaces 131 of the sheets 130 via thermal attachment. The sheets 130 have the same refractive index as that of the two triangular prisms 110, 120.

Figure 2:
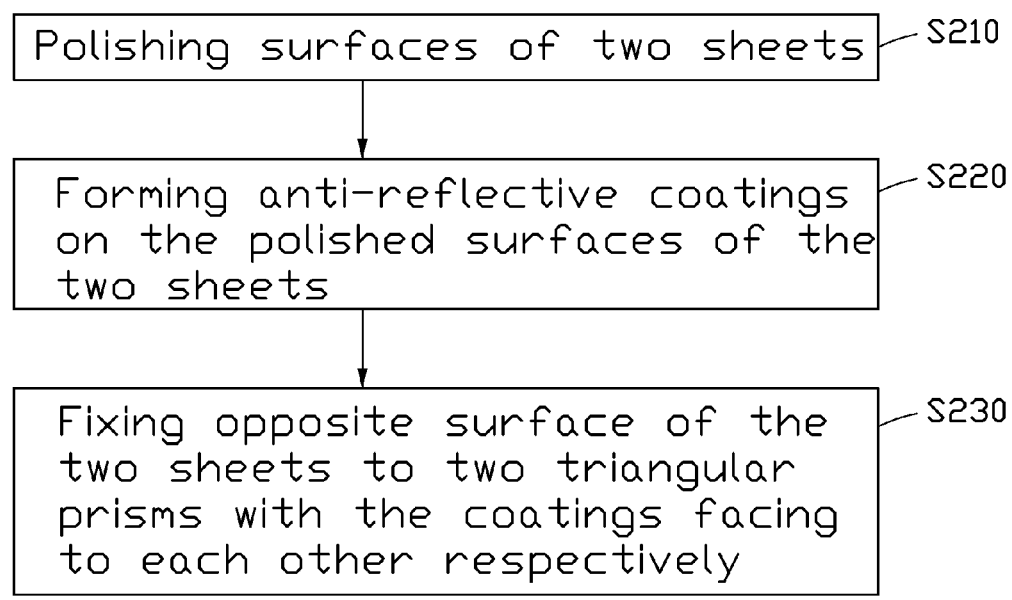
FIG. 2 is a flow chart of assembling the TIR prism of FIG. 1.

Referring to FIG. 2, a method of assembling the TIR prism 100 includes the following operations S210~230.

S210: polishing the surfaces 131 of the two sheets 130 respectively.

S220: respectively forming anti-reflective coatings 133 on the polished surfaces 131 of the two sheets 130.

S230: respectively fixing the opposite surfaces 132 of the two sheets 130 to the two hypotenuse faces 111, 121 of the two triangular prisms 110, 120 with the two coatings 133 facing each other and with a space 150 left therebetween.

It is understandable that the surfaces 132 of the two sheets 130 can be polished and the anti-reflective coatings 133 can be coated on the surfaces 132 of the two sheets 130 respectively.

Figure 3:
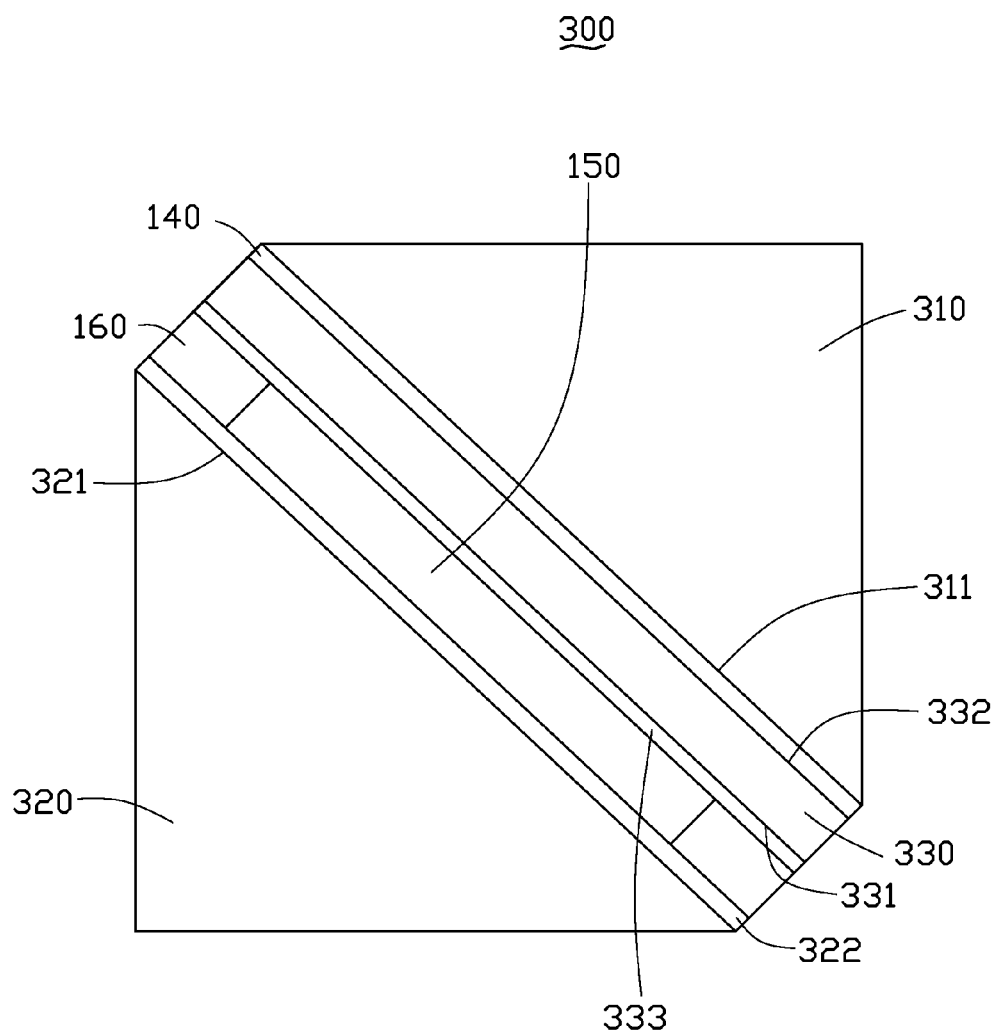
FIG. 3 is a schematic view of a TIR prism according to a second exemplary embodiment.

Referring to FIG. 3, a TIR prism 300 is shown. The TIR prism 300 is similar to the TIR prism 100. The difference is that the TIR prism 300 includes a plastic triangular prism 310, a glass triangular prism 320, and a glass sheet 330 interposed therebetween.

The plastic triangular prism 310, and the glass triangular prism 320 are symmetrically shaped and respectively have two hypotenuse faces 311, 321 facing each other. The hypotenuse face 321 of the glass triangular prism 320 is coated with an anti-reflective coating 322. The glass sheet 330 has two opposite surfaces 331, 332. The surface 332 of the glass sheet 330 is attached to the hypotenuse face 311 of the plastic triangular prism 310 by the first adhesive 140. The surface 331 of the glass sheet 330 with an anti-reflective coating 333 formed thereon is fixed to the hypotenuse face 321 of the glass triangular prism 320 with a space 150 left therebetween by the second adhesive 160. The plastic triangular prism 310, the glass triangular prism 320, the sheet 330 and the first adhesive 140 have the same refractive index. Other aspects of the second exemplary embodiment are the same as that of the first exemplary embodiment, and are not described in detail.

Compared with the related art, both the sheets and prisms can be efficiently produced. Therefore, production yield increases.

It will be understood that the above particular embodiments are described and shown in the drawings by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A TIR prism for use in a digital light processing projection device, the TIR prism comprising:
    a prism monomer comprising:
        a plastic triangular prism having a hypotenuse surface; and
        a glass sheet having two opposite surfaces, one surface being attached to the hypotenuse surface of the plastic triangular prism, the other surface having an anti-reflective coating formed thereon; and
    a triangular prism having a hypotenuse surface facing the coated surface of the glass sheet;
    wherein the triangular prism is made of glass; and
    wherein the hypotenuse surface of the glass triangular prism has an anti-reflective coating formed thereon and is fixed to the coated surface of the glass sheet with a space left therebetween.

2. The TIR prism as claimed in claim 1, wherein refractive indexes of the plastic triangular prism and the glass sheet are substantially equal to each other.

3. The TIR prism as claimed in claim 1, further comprising a first adhesive, configured for fixing the glass sheet to the hypotenuse surface of the plastic triangular prism.

4. The TIR prism as claimed in claim 3, wherein the first adhesive is curable resin.

5. The TIR prism as claimed in claim 4, wherein the curable resin is an ultraviolet-curable resin.

6. The TIR prism as claimed in claim 3, wherein refractive indexes of the plastic triangular prism, the glass sheet, and the first adhesive are substantially equal to each other.

* * * * *